United States Patent [19]
Tanaka

[11] 3,961,364
[45] June 1, 1976

[54] COLOR TELEVISION CAMERA

[75] Inventor: Hiromichi Tanaka, Neyagawa, Japan

[73] Assignee: Matsushita Electric Industrial Co., Ltd., Osaka, Japan

[22] Filed: Nov. 26, 1974

[21] Appl. No.: 527,267

[30] Foreign Application Priority Data
Nov. 27, 1973  Japan.............................. 48-133883

[52] U.S. Cl. ................................................. 358/46
[51] Int. Cl.²......................................... H04N 9/07
[58] Field of Search .................. 358/46, 67, 69, 70; 315/370

[56] References Cited
UNITED STATES PATENTS
| | | | |
|---|---|---|---|
| 2,843,659 | 7/1958 | James ................................. | 358/46 |
| 3,721,752 | 3/1973 | Kakizaki ............................. | 358/46 |

*Primary Examiner*—George H. Libman
*Assistant Examiner*—John C. Martin
*Attorney, Agent, or Firm*—Stevens, Davis, Miller & Mosher

[57] ABSTRACT

There is provided a color television camera of the type employing a photoconductive type pickup tube having a signal electrode consisting of a plurality of transparent electrode segments, a striped color filter and a photoconductive surface, wherein a color separated image is formed on the photoconductive surface, and at least one of the electrode segments constituting the signal electrode consists of a plurality of electrode elements each having a width greater than the recurrence cycle of the filter-element sets of the stripped color filter with each of the electrode elements being formed with a plurality of beam current interrupting portions arranged at the intervals smaller than the recurrence cycle of the filter-element sets of the striped color filter. By virtue of this arrangement, the frequency of the spurious signals generated at the dividing slot separating the signal electrode into the plurality of the electrode segments and the beam current interrupting portions in response to the beam scanning falls outside the frequency bands of the luminance signal and the frequency modulated chrominance signal, thus eliminating the detrimental effects of the spurious signals and reducing the stray capacitance existing between the plurality of the electrode segments. The modulated chrominance signal is demodulated by means of a reference signal derived by multiplying integral times the frequency of an index signal produced from the output of at least one of the electrode segments for providing the respective color signals.

12 Claims, 14 Drawing Figures

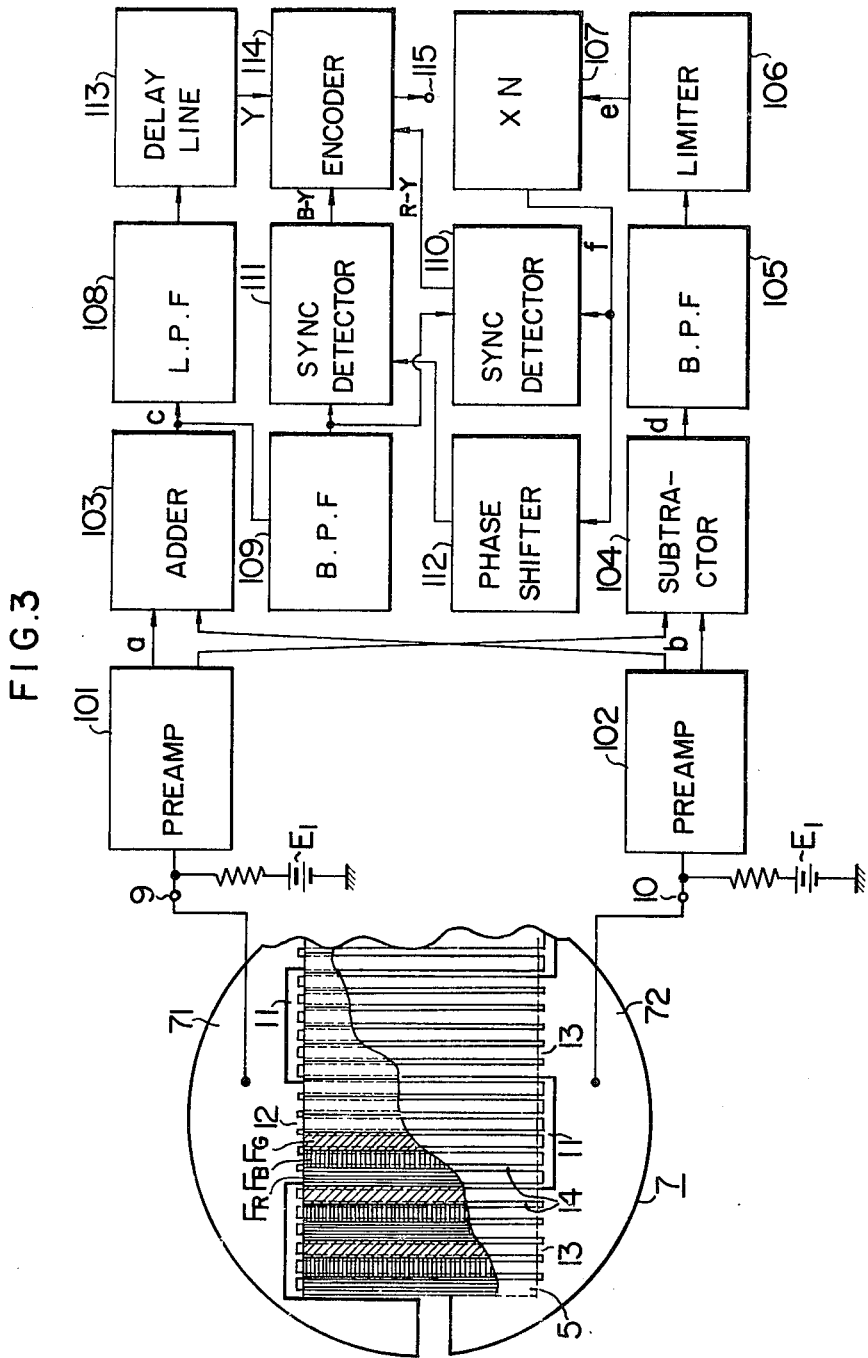
F I G. 3

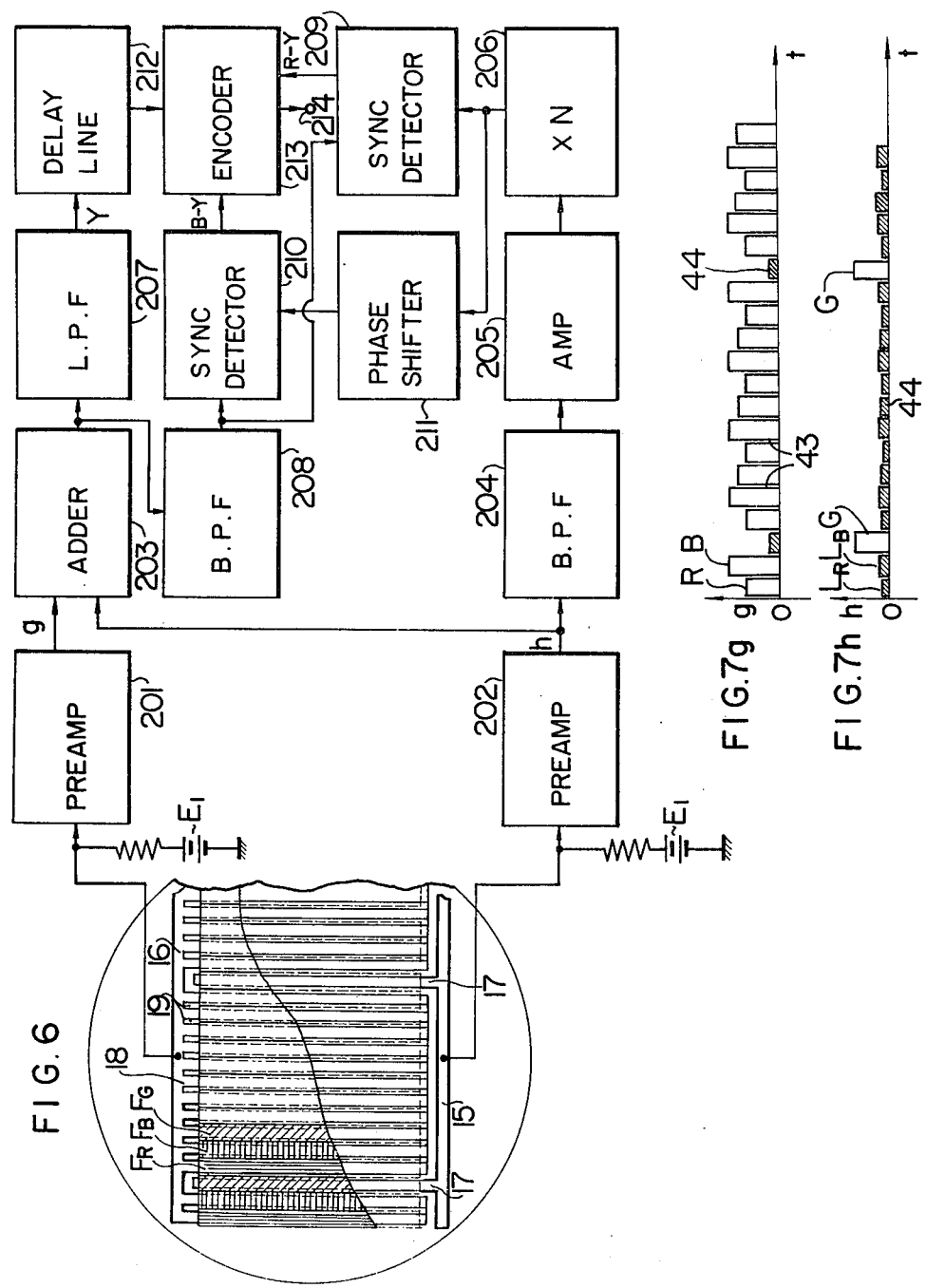

COLOR TELEVISION CAMERA

The present invention relates to color television cameras and especially to the type employing a single pickup tube for producing a color video signal.

Apparatus of the type employing a single pickup tube for producing a color video signal are shown, for example, in U.S. Pat. Nos. 2,733,291 and 3,647,943, in which color component lights are spatially modulated at two different frequencies or at a single frequency provided by a striped color filter having stripes arranged in a predetermined angular direction with respect to the direction of the line scanning, and the output signals derived by the line scanning are passed through a plurality of bandpass filters or a comb-filter to separate color component signals, while on the other hand the third color component signal is derived from the unmodulated signals. However, the conventional apparatus of this type have certain disadvantages, such as, the production of shading due to the difference in output waveform between the modulated signals and the unmodulated signal (including the A.C. components), and the instability of white balance due to the dark current.

Another example of the apparatus of the single pickup tube type is described in U.S. Pat. No. 2,736,763, in which the transparent electrode is divided into a plurality of electrode elements corresponding to the respective filter elements of a striped color filter, whereby the respective color component signals are derived from the corresponding ones of the electrode elements. A disadvantage of this electrode structure is that the presence of large stray capacitance between the electrode-element sets gives rise to a problem of crosstalk between the electrode segments and moreover the processing required for dividing the transparent electrode into the respective segments involves difficulties.

Still another example of the apparatus of this type is disclosed in U.S. Pat. No. 2,843,659, in which the signal electrode is divided into a pair of electrode segments each having a plurality of electrode elements of the same width as the recurrence cycle of the respective filter-element sets of the associated striped color filter, whereby reference signals are derived from the outputs of the electrode segments, and the output signals from the electrode segments are subjected to phase detection in accordance with the reference signals to provide the respective color component signals. A disadvantage of this apparatus is that since each of the electrode segments of the signal electrode must be divided at the recurrence frequency of one half the recurrence frequency of the striped color filter, the length of the dividing slot tends to be longer thus giving rise to a difficult problem of interelectrode stray capacitance and hence the same difficult problems of crosstalk, etc. as in the previously mentioned conventional apparatus. Another disadvantage is that the spurious components produced at the dividing slot separating the electrode segments from each other interferes with the modulation frequency band of the chrominance signal or the low frequency signals.

It is therefore an object of the present invention to provide a color television camera which employs a single pickup tube for producing a color video signal with an excellent color reproduction quality.

It is another object of the present invention to provide a signal electrode structure for a pickup tube which permits processing of the signal electrode with comparative ease and ensures considerably reduced crosstalk.

It is still another object of the present invention to provide an optical index signal generating device which is capable of deriving stable index signals without being affected by the variations in the light components.

In accordance with these and many other objects, the present invention comprises a color television camera of the type employing a single photoconductive type pickup tube having a signal electrode consisting of a plurality of transparent electrode segments, a striped color filter and a photoconductive surface, wherein a color separated image is formed on the photoconductive surface, at least one of the electrode segments constituting the signal electrode consists of a plurality of electrode elements each having a width greater than the recurrence cycle of the respective filter-element sets of the striped color filter, each of the electrode elements is provided with a plurality of beam current interrupting portions arranged at predetermined intervals smaller than the recurrence cycle of the filter element sets, whereby the spurious components produced at the dividing slot separating the plurality of electrode segments and the beam current interrupting portions in response to the line scanning are outside the frequency bands of the luminance signal and the modulated chrominance signal. The sum signal of the output signals derived from the electrode segments is passed through a low-pass filter and a band-pass filter, respectively, to provide the luminance signal and the modulated chrominance signal from which the spurious components have been eliminated, and the reference signal required for synchronously detecting the modulated chrominance signal to produce color difference signals is provided by multiplying integral times an index signal derived from the output of at least one of the electrode segments.

According to an embodiment of the present invention, the signal electrode consists of a plurality of electrode segments divided in such a manner that the resulting electrode elements are arranged at predetermined intervals of integral multiple of the recurrence cycle of the filter-element sets in the striped color filter, and each of the electrode elements is provided with a plurality of beam current interrupting slits arranged at the same intervals as the width of the filter elements. The index signal is derived by producing the difference between the outputs derived from the electrode segments.

In another embodiment of the present invention, the signal electrode structure comprises a first electrode whose electrode elements are arranged at predetermined intervals of integral multiple of the recurrence cycle of the filter element sets, and a second electrode consists of a plurality of electrode elements each covering a plurality of the filter elements and provided with a plurality of beam current interrupting portions which are arranged at the same intervals as the width of the filter elements. The composite signal of the output signals derived from the electrodes is passed through filters to provide the luminance signal and the modulated chrominance signal, and an index signal is derived from the first electrode. A feature of this embodiment is that the phase of the index signal is not changed with the incident color component lights.

The apparatus according to the present invention has among its great advantages the fact that it is capable of reducing the number of separate electrode segments of the signal electrode with the result that the processing of the signal electrode is made easier, and the interelectrode stray capacitance is reduced thus making it possible to derive a relatively stable optical index. Another advantage of the apparatus of the invention is that it is capable of eliminating the effects of the spurious components produced by the beam current interrupting portions including the dividing slot.

Still another advantage is that contrary to the apparatus as disclosed in U.S. Pat. No. 3,688,020 in which the index signal is produced electrically, the apparatus of this invention is realized with a relatively simple construction, and there is no line crawl generation which would otherwise be produced on the reproduced picture due to the phase reversal of the index signal caused between the succeeding lines in the operation within the relatively small range of the target current.

The above and other objects, features and advantages of the present invention will become readily apparent from considering the following detailed description taken in conjuntion with the accompanying drawings, in which:

FIG. 3 is a block diagram showing the principal part of an embodiment of the color television camera of the invention shown schematically in FIG. 1;

FIG. 6 is a block diagram showing the principal part of another embodiment of the color television camera according to the invention;

FIGS. 7g and 7h are waveform diagrams which are useful in explaining the operation of the embodiment shown in FIG. 6.

The present invention will now be described in greater detail with reference to the accompanying drawings.

Figure 1:
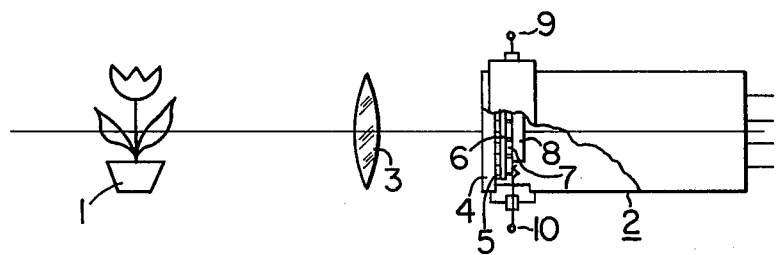
FIG. 1 is a schematic diagram showing an exemplary form of a pickup tube used in a color television camera according to the present invention.
Figure 2:
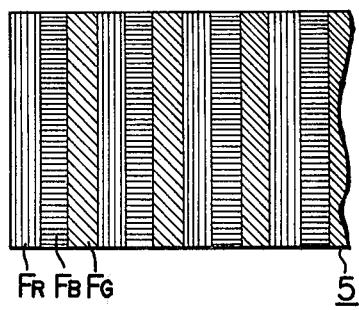
FIG. 2 is a schematic diagram showing the color filter used in the pickup tube of FIG. 1.

Referring first to FIG. 1, there is illustrated an exemplary form of a pickup tube used in a single tube color television camera in accordance with the present invention. In FIG. 1, numeral 1 designates an object to be televised, 2 a pickup tube, 3 a lens for focusing an optical image of the object to be televised on a photoconductive surface 8 of the pickup tube 2, 4 the face plate of the pickup tube 2, 5 a striped color filter, 6 an insulating layer, 7 a transparent electrode. As shown in FIG. 2, the striped color filter 5 comprises a plurality of recurrently arranged sets of filter elements $F_R$, $F_B$ and $F_G$ for respectively passing red, blue and green component lights. The transparent electrode 7 is constructed as shown in FIG. 3; that is, it comprises a pair of comb shaped electrode segments 71 and 72 to each of which is applied a target voltage $E_1$, and the respective elements of the electrode segments are formed to alternately cover the filter elements of the striped color filter 5 corresponding to two times the recurrence cycle of the filter-element sets. In other words, the electrode segments 71 and 72 are divided by a dividing slot 11 at intervals of two times the recurrence cycle of the filter-element sets to form electrode elements 12 and 13. Each of the electrode elements is provided with a plurality of electrode-removed portions 14 for interrupting beam current each having the same width as the dividing slot 11 in the electrode segments.

Figure 4A:
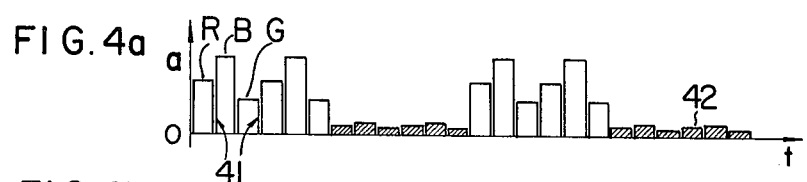
FIGS. 4a through 4f are waveform diagrams which are useful in explaining the operation of the embodiment shown in FIG. 3.
Figure 4B:
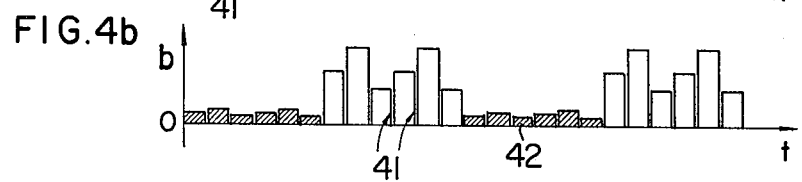
Figure 4C:
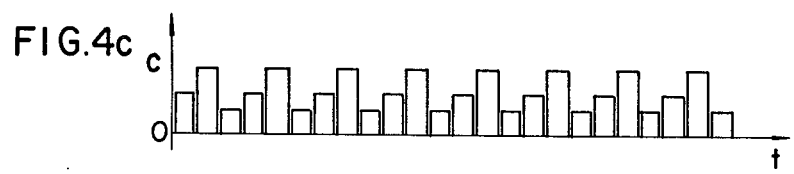
Figure 4D:
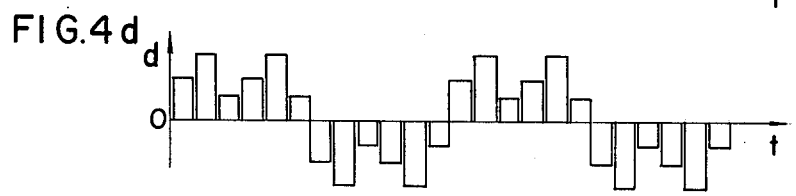
Figure 4E:
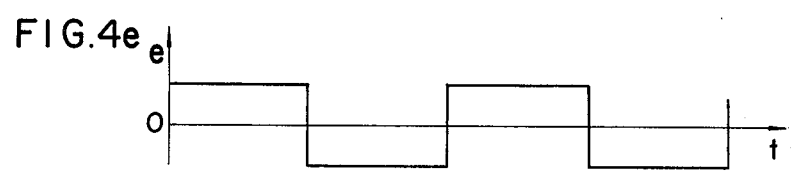
Figure 4F:
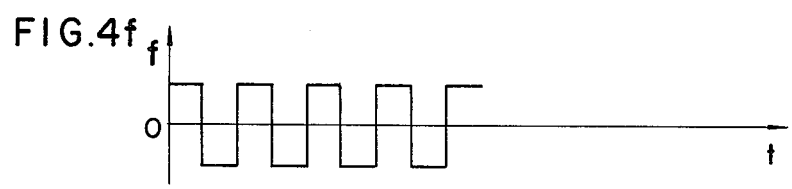

The signals respectively generated at output terminals 9 and 10 of the electrode segments 71 and 72 by the line scanning are respectively applied to preamplifiers 101 and 102 whose output signals are respectively shown in FIGS. 4a and 4b. In the waveform of the output signals a and b, numeral 41 indicates those portions where there are no signal components due to the dividing slot 11 and the removed portions 14 of the transparent electrode 7 (the portions are hereinafter referred as spurious components), and the hatched portions designated by numeral 42 are crosstalk components due to the presence of the interelectrode stray capacitance. These output signals are applied to an adder circuit 103 and a subtractor circuit 104 so that the output signals shown in FIGS. 4c and 4d are respectively generated from the adder circuit 103 and the subtractor circuit 104. The output signal d is applied to a limiter 106 through a band-pass filter 105 whose center frequency is the recurrence frequency of the electrode elements, so that the limiter 106 generates the index signal shown in FIG. 4e. The frequency of the index signal is increased by N times by an N-fold frequency multiplier 107 ($N = 4$) to generate the reference signal shown in FIG. 4f and having the same frequency as the recurrence frequency of the striped color filter 5.

On the other hand, the output signal c of the adder circuit 103 is applied to a low-pass filter 108 and a band-pass filter 109 whose center frequency is the recurrence frequency of the striped color filter 5, so that the low-pass filter 108 and the band-pass filter 109 generate respectively a luminance signal and a modulated chrominance signal both of which include no spurious components. The modulated chrominance signal is applied to synchronous detectors 110 and 111, so that the modulated chrominance signal is synchronously detected in accordance with the phase adjusted reference signal f shown in FIG. 4f and in accordance with the reference signal f phase shifted by a phase shifter 112, respectively, to generate color difference signals (R - Y) and (B - Y). An encoder 114 receives the luminance signal through a delay line 113 and the synchronously detected color difference signals and it generates an NTSC standard signal at its output terminal 115.

If, differing from the present invention, the dividing interval of the electrode segments is selected smaller than the recurrence cycle of the filter-element sets, it results in an increased interelectrode stray capacitance and hence it is difficult to provide the required index signal sufficiently by the effect of crosstalk. On the other hand, if the dividing interval of the electrode segments is selected greater than the recurrence cycle of the filter element sets, the spurious components generated at the dividing slot tend to interfere with the video signal with a resulting adverse effects. In accordance with the present invention, however, the fundamental frequency of the spurious components generated at the electrode-removed portions 14 and the dividing slot 11 formed in the electrode elements 12 and 13 is three times as large as the modulation frequency of the chrominance signal and it is outside of the frequency bands of the luminance signal and the modulated chrominance signal, thus eliminating the occurrence of such adverse effects by taking off the spurious component with the low-pass filter 108 and band-pass filter 109.

Figure 5:
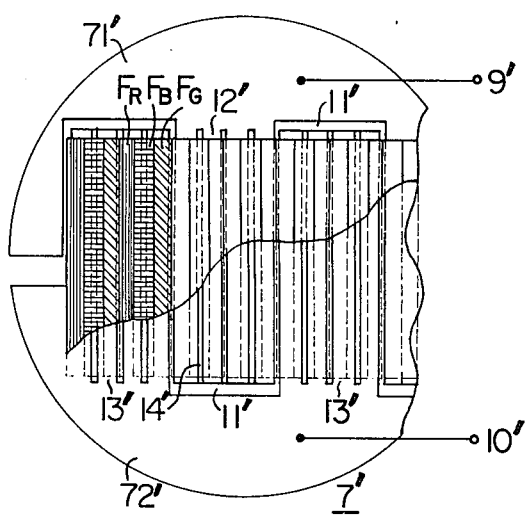
FIG. 5 is a schematic diagram showing another form of the transparent electrode structure used in the pickup tube of the invention.

Referring now to FIG. 5, there is illustrated another form of the transparent electrode structure with which the video signal generating circuit shown in FIG. 3 can be used without any modification. In FIG. 5, the portions corresponding to those of the structure of FIG. 3 are designated by the same reference numerals with a prime. The electrode structure of FIG. 5 differs from the structure of the transparent electrode 7 shown in FIG. 3 in that while electrode segments 71' and 72' are divided at the same intervals as in the electrode structure shown in FIG. 3, the interval between the respective removed portions 14' in the respective electrode element is selected as one half the recurrence cycle of the striped color filter-element sets. Also with this electrode structure, the fundamental frequency of the spurious components is two times the modulation frequency of the chrominance signal, and therefore these spurious components may be removed through the band-pass filter 109 and the low-pass filter 108. The electrode structure shown in FIG. 5 ensures a high degree of light utilization and hence an improved sensitivity as compared with the electrode structure shown in FIG. 3.

The width of the electrode elements need not always be selected to be an integral multiple of the recurrence cycle of the striped color filter-element sets, and it is only necessary that any selected width of the electrode elements satisfies a relationship so that the difference signal generated by multiplying the frequency of the index signal by integral times, which produced from the output signal of at least one of the electrode segments (i.e., the electrode segments 71' and 72') has the same frequency as the chrominance modulation frequency. For instance, the width of the electrode elements may be selected about two and half times the recurrence cycle of the filter-element sets of the striped color filter. In this case, it is necessary that the N-fold frequency multiplier 107 consists of a frequency quintupler which multiplies by five times the frequency of the generated index signal to generate the required reference signal.

FIG. 6 illustrates another embodiment of the color television camera according to the present invention. In this embodiment, the transparent electrode consists of electrode segments 15 and 16. In the electrode segment 15, each of electrode elements 17 is associated with a given filter element which passes a specified color (in this embodiment, a filter element $F_G$ which passes the G component), and the interval between the electrode elements 17 is four times the recurrence cycle of the filter-element sets, whereas the electrode segment 16 is provided with a plurality of elements 18 each covering the plurality of the filter elements between the elements 17, and the elements 18 are provided with electrode-removed portions 19 arranged at the intervals corresponding to the width of the striped color filter elements.

The outputs generated from the electrode segments 15 and 16 by the line scanning are respectively passed through preamplifiers 201 and 202, and they are then applied to an adder circuit 203. The output waveforms of the preamplifiers 201 and 202 are respectively shown in FIGS. 7g and 7h, and in these waveforms numeral 43 indicates the spurious components and numeral 44 designates the components due to crosstalk between the electrodes. The output h of the preamplifier 202 is passed through a band-pass filter 204 whose center frequency is the recurrence frequency of the electrode elements 17 to pass only the fundamental frequency component which is in turn passed through a limiter 205 and applied to an N-fold frequency multiplier 204 ($N = 4$) to generate a reference signal. The reference signal is applied, after phase adjustment, to a synchronous detector 209 for generating a color difference signal (R - Y) and to a synchronous detector 210 for generating a color difference signal (B - Y) through a phase shifter 211. The output of the adder circuit 203 is applied, in the same manner as in the embodiment shown in FIG. 3, to a low-pass filter 207 and a band-pass filter 208, so that the low-pass filter 207 generates as its output the luminance signal, and the band-pass filter 208 generates as its output the modulated chrominance signal which is subjected to synchronous detection in the synchronous detectors 209 and 210 to generate the color difference signals. An encoder 213 receives the luminance signal Y through a delay line 212 and the color difference signals (R - Y) and (B - Y) so that these input signals are matrixed to generate an NTSC standard signal at an output terminal 214.

Also in this embodiment, the spurious components 43 are removed by the low-pass filter 207 and the band-pass filter 208. Further, a feature of the second embodiment is that the phase of the index signal is not changed by changes in the color components in the incident light, since each electrode element 17 is associated with the filter element ($F_G$) which passes a specified color component (green incident light in this case). However, there is a disadvantage that the signal-to-noise ratio of the index signal is not satisfactory. To overcome this deficiency, a pair of electrodes for providing an index signal may be arranged as shown in FIG. 8.

Figure 8:
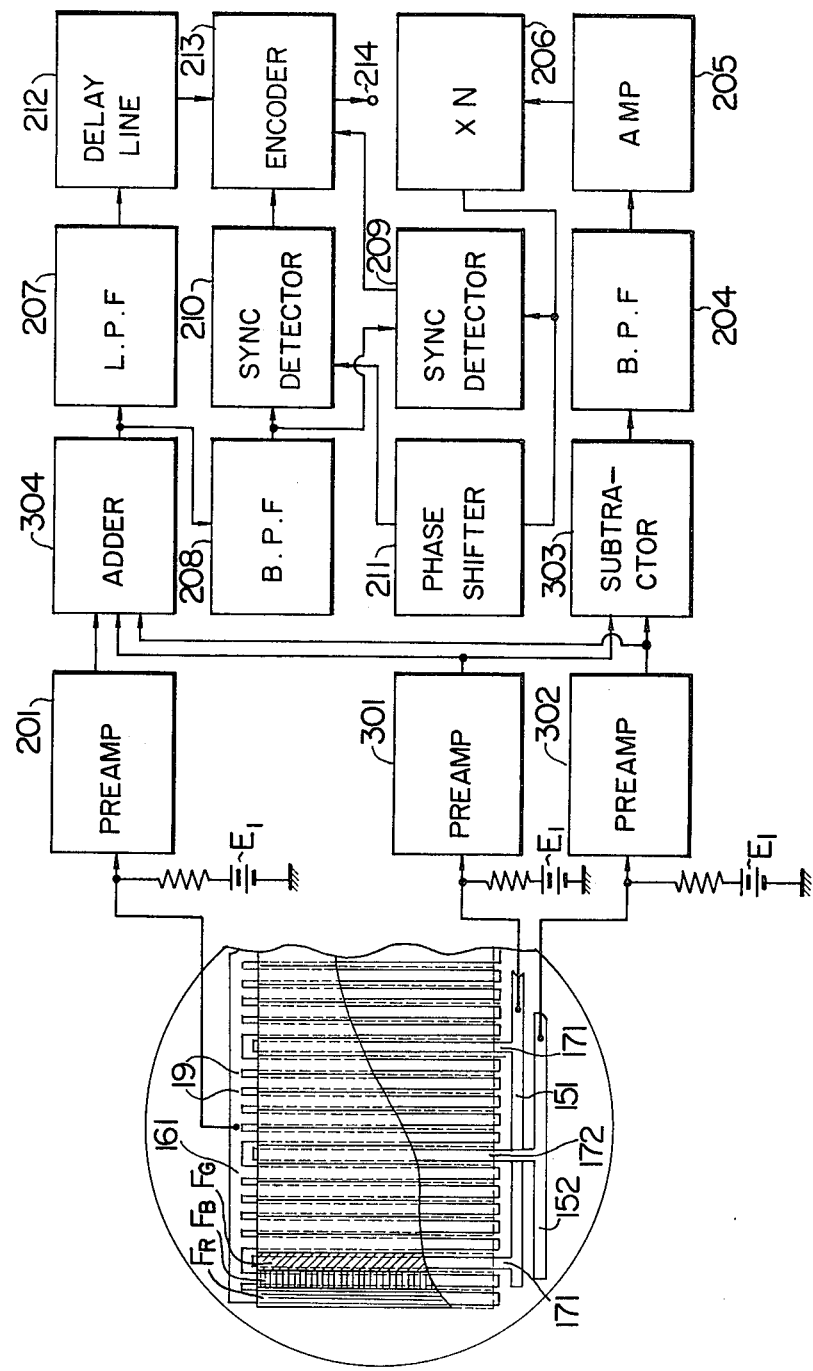
FIG. 8 is a block diagram showing the principal part of still another embodiment of the color television camera of the invention.

In the third embodiment shown in FIG. 8, the electrode structure consists of an electrode segment 151 corresponding to the electrode segment 15 and having a plurality of electrode elements 171, an electrode segment 152 having each electrode element 172 arranged midway between the electrode elements 171 and associated with the same color component passing filter element ($F_G$) as that of the electrode elements 171, and an electrode segment 161 corresponding to the electrode segment 16 shown in FIG. 6. In this third embodiment, the output signals of the electrode segments 151 and 152 are respectively passed through preamplifiers 301 and 302 and are then applied to a subtractor 303 which generates the difference between the signals to provide an index signal, and consequently it is possible to provide the index signal having a greater amplitude and thereby to provide an improved S/N ratio of the index signal. The luminance signal and the chrominance signal are generated by adding the output signals derived from the three electrode segments in an adder 304 and then applying the output signal of the adder 304 to a low-pass filter 207 and a band-pass filter 208. The remaining blocks of the video signal generating circuit are the same with the corresponding blocks in the embodiment of FIG. 6 and therefore they will not be described.

While, in the embodiments of the present invention described so far, the transparent signal electrode is formed with slits to provide the required beam current interrupting portions in the electrode elements, the same results may be accomplished by depositing for example coatings of $SiO_2$ or photo resist on the surfaces of the electrode segments facing in the direction of movement of the beam. The deposition of such beam current interrupting material is easier than the formation of slits in the hard transparent electrode. Further, while, in these embodiments, the electrode segments are provided in the form of combs, it is of course possible to provide the required electrode segment by connecting a large number of electrode elements to a bus bar.

Since the beam current interrupting portions formed in the electrode segments are provided so that the spurious components are not in the same bands as the luminance signal and the chrominance signal, they need not be provided with such a high degree of accuracy as required for the dividing slot which must completely separate the electrode segments from each other to permit the production of index signals. For example, the desired results may be achieved even if the slit or slits in the electrode elements are partially short circuited. Consequently, as in the present invention, to reduce the number of the divided electrode segments in the signal electrode that usually requires a high degree of processing accuracy; that is, to reduce the length of the dividing slot has the effect of not only reducing the stray capacitances and hence crosstalk, but also ensuring an improved yield.

Further, it is possible to apply a biasing light to the target along with the incident light to improve the efficiency of the apparatus of the present invention.

Furthermore, the present invention is not intended to be limited to the embodiments described hereinabove, since various changes and modifications may be made without departing in any way from the spirit and scope of the present invention.

What we claim is:

1. A color television camera for generating an electrical signal corresponding to an object to be televised, comprising:

a photoconductive surface adapted to convert an image focused thereon into an electrical signal;

a striped color filter disposed between said object and said scanning surface and adapted to form on said scanning surface a color separated image in accordance with the color components of said object;

a signal electrode divided into a plurality of separate electrode segments, at least one of said plurality of separate electrode segments consisting of a plurality of elements each having a width greater than the recurrence cycle of the filter-element sets in said striped color filter, each of said elements provided with a plurality of beam current interrupting portions arranged at predetermined intervals smaller than said recurrence cycle; and circuit means adapted for generating from the signals derived from said plurality of electrode segments by the scanning of the electron beam an index signal for generating a color video signal.

2. A color television camera according to claim 1, wherein said beam current interrupting portions formed in the elements of the electrode segments constituting the signal electrode are provided by cutting slits in said electrode segments in the lengthwise direction of the striped color filter elements.

3. A color television camera according to claim 1, wherein the beam current interrupting portions formed in the elements of the electrode segments constituting the signal electrode are provided with coatings of a beam current interrupting substance deposited in the lengthwise direction of the striped color filter elements on one surface of said electrode segments facing in the direction of movement of the electron beam.

4. A color television camera according to claim 1, wherein said index signal generating circuit means comprise:

first circuit means for generating from the output signals derived from said plurality of electrode segments a luminance signal component and a modulated chrominance signal component modulated with a recurrence frequency of said filter element, both of which include spurious signal components generated at a dividing slot separating the signal electrode into the electrode segments and the beam current interrupting portions in the elements of said at least one electrode segment and having a frequency higher than the modulation frequency of said modulated chrominance signal component;

second circuit means for generating an index signal from at least one of said output signals of the plurality of the electrode segments;

third circuit means for removing said spurious signal components from said composite signal;

fourth circuit means for generating from said index signal a reference signal having the same frequency as the modulation frequency of said modulated chrominance signal; and fifth circuit means whereby color signals corresponding to the color components are generated with said reference signal from said modulated chrominance signal from which said spurious signal components have been removed.

5. A color television camera for generating an electrical signal corresponding to an object to be televised, comprising:

a photoconductive surface adapted to convert an image focused thereon into an electrical signal when said image is scanned by an electron beam;

a striped color filter disposed between said object and said photoconductive surface and adapted to form on said photoconductive surface a color separated image in accordance with the color components of said object, said filter consisting of a plurality of sets of color filter elements each thereof passing a different color and arranged in a predetermined angular direction with respect to the scanning direction of said electron beam;

a signal electrode divided into a plurality of segments, at least one of said divided electrode segments consisting of a plurality of electrode elements each thereof having a width greater than the recurrence cycle of said filter element sets of said striped color filter and provided with a plurality of beam current interrupting portions arranged at predetermined intervals smaller than said recurrence cycle;

first circuit means for generating from the output signals of said plurality of electrode segments derived by the scanning of said electron beam a composite signal consisting of a luminance signal component and a modulated chrominance signal component of said object, and spurious signal components generated in response to the dividing slot dividing said signal electrode into said electrode segments and said beam current interrupting formed in the elements of said at least one electrode segment and having a frequency higher than the frequency bands of said luminance signal and said modulated chrominance signal;

second circuit means for deriving an index signal from at least one of the output signals of said plurality of electrode segments and generating from said index signal a reference signal having the same frequency as the modulation frequency of said modulated chrominance signal;

third circuit means including filter means for removing said spurious signal components from said luminance signal component and modulated chrominance signal component; and fourth circuit means whereby signals corresponding to the color components are demodulated with said reference signal from said modulated chrominance signal from which said spurious signal components have been removed.

6. A color television camera according to claim 5, wherein said signal electrode consists of a first electrode segment and a second electrode segment, the electrode elements of said first and second electrode segments being arranged alternately in the direction of the scanning of the electron beam and each having a width greater than the recurrence cycle of the color filter element sets, each of said electrode elements being provided with a plurality of beam current interrupting portions arranged at predetermined intervals smaller than said recurrence cycle of the color filter-element sets, wherein said first circuit means includes an adder circuit for adding the output signals from said first and second electrode segments, and wherein said second circuit means include a subtractor circuit for producing the difference between the output signals from said first and second electrode segments, and a circuit for multiplying integral times the frequency of the output signal of said subtractor circuit and generating said reference signal.

7. A color television camera according to claim 6, wherein the interval between the beam current interrupting portions formed in said first and second electrode segments is equal to the width of the color filter elements, whereby the fundamental frequency of the spurious components generated at the dividing slot of the signal electrode and the beam current interrupting portions is three times the modulation frequency of the modulated chrominance signal.

8. A color television camera according to claim 6, wherein the interval between the beam current interrupting portions formed in said first and second electrode segments is one half the recurrence cycle of the color filter-element sets, whereby the fundamental frequency of the spurious signal components generated at the dividing slot of the signal electrode and the beam current interrupting portions is two times the modulation frequency of the modulated chrominance signal.

9. A color television camera according to claim 5, wherein said signal electrode includes a first electrode segment having a plurality of electrode elements arranged in such a manner that each of said elements is superposed on a given one of the filter elements which passes a preselected color component at every integral number thereof, and a second electrode segment having a plurality of electrode elements each thereof superposed on a plurality of the color filter elements arranged between said electrode elements of said first electrode segment and provided with a plurality of beam current interrupting portions arranged at predetermined intervals smaller than the recurrence cycle of the color filter-element sets, wherein said first circuit means includes an adder circuit for adding the output signals from said first and second electrode segments, and wherein said second circuit means includes a circuit for multiplying integral times the fundamental frequency of the output signal from said first electrode segment to generate said reference signal.

10. A color television camera according to claim 8, wherein the interval between the beam current interrupting portions formed in the second electrode segment is equal to the width of the striped color filter elements.

11. A color television camera according to claim 5, wherein said signal electrode includes a first electrode segment having a plurality of electrode elements arranged in such a manner that each said element is superposed on a given one of the color filter elements which passes a preselected color component at every plural number thereof, a second electrode segment having at least one electrode element superposed on one of said filter elements adapted to pass said preselected color component and located between said electrode elements of said first electrode segment, and a third electrode segment having a plurality of electrode elements each thereof superposed on a plurality of the filter elements located between said electrode elements of said first and second electrode segments and provided with a plurality of beam current interrupting portions arranged at predetermined intervals smaller than the recurrence cycle of the filter-element sets, wherein said first circuit means included an adder circuit for adding the output signals from said first, second and third electrode segments, and wherein said second circuit means include a subtractor circuit for producing the difference between the output signals from said first and second electrode segments, and a circuit for multiplying integral times the fundamental frequency of the output signal of said subtractor circuit to generate said reference signal.

12. A color television camera according to claim 11, wherein the interval between the beam current interrupting portions formed in the electrode elements of said third electrode segment is equal to the width of the striped color filter elements.

* * * * *